US012579951B2

(12) United States Patent
Wang et al.

(10) Patent No.: US 12,579,951 B2
(45) Date of Patent: Mar. 17, 2026

(54) ELECTRONIC PAPER DISPLAY DEVICE AND DRIVING METHOD THEREFOR

(71) Applicants: Beijing BOE Display Technology Co., Ltd., Beijing (CN); BOE Technology Group Co., Ltd., Beijing (CN)

(72) Inventors: Zhe Wang, Beijing (CN); Guangquan Wang, Beijing (CN); Liguang Deng, Beijing (CN); Gang Hua, Beijing (CN); Dong Wang, Beijing (CN); Min Wang, Beijing (CN); Shaobo Li, Beijing (CN); Jintang Hu, Beijing (CN); Shaokai Su, Beijing (CN); Jinghao Liu, Beijing (CN); Liangliang Pan, Beijing (CN); Jiahao Bai, Beijing (CN); Zhining Lin, Beijing (CN); Xinyu Chen, Beijing (CN); Zixi Qi, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/684,997

(22) PCT Filed: Nov. 23, 2021

(86) PCT No.: PCT/CN2021/132588

§ 371 (c)(1),
(2) Date: Feb. 20, 2024

(87) PCT Pub. No.: WO2023/092309

PCT Pub. Date: Jun. 1, 2023

(65) Prior Publication Data

US 2024/0355301 A1 Oct. 24, 2024

(51) Int. Cl.
*G09G 3/34* (2006.01)

(52) U.S. Cl.
CPC ..... *G09G 3/344* (2013.01); *G09G 2300/0426* (2013.01); *G09G 2320/0242* (2013.01); *G09G 2320/0257* (2013.01)

(58) Field of Classification Search
CPC .. G09G 3/344; G09G 3/34; G09G 2300/0426; G09G 2320/0242; G09G 2320/0257; G02F 1/167
See application file for complete search history.

(56) References Cited

U.S. PATENT DOCUMENTS

| | | | | |
|---|---|---|---|---|
| 6,639,580 | B1 | 10/2003 | Kishi et al. | |
| 2002/0024620 | A1 * | 2/2002 | Miyamoto | G02F 1/1679 349/2 |

(Continued)

FOREIGN PATENT DOCUMENTS

| | | | |
|---|---|---|---|
| CN | 101614927 | A | 12/2009 |
| CN | 101963733 | A | 2/2011 |

(Continued)

OTHER PUBLICATIONS

PCT/CN2021/132588 international search report dated Aug. 30, 2022.

*Primary Examiner* — Christopher E Leiby
(74) *Attorney, Agent, or Firm* — IPro, PLLC

(57) ABSTRACT

An electronic paper display device includes a first base substrate, and a plurality of sub-pixels on the first base substrate. Each sub-pixel includes: a first electrode on the first base substrate; a second electrode on the first electrode and including a plurality of grooves passing through thereof, the orthographic projection of the grooves on the first base substrate falling within the orthographic projection of the first electrode on the first base substrate; a microstructure on the side of the second electrode away from the first base substrate and including a paper film microcavity and a plurality of charged particles in the paper film microcavity, (Continued)

where the plurality of charged particles include a plurality of first color charged particles and a plurality of second color charged particles with opposite electrical properties; and a third electrode on the side of the microstructure away from the second electrode.

12 Claims, 14 Drawing Sheets

(56) References Cited

U.S. PATENT DOCUMENTS

2002/0060836 A1* 5/2002 Uno ........................ G02F 1/167 359/296
2002/0067333 A1* 6/2002 Uno ........................ G02F 1/167 345/107
2003/0011869 A1* 1/2003 Matsuda ............. G02F 1/16756 345/107
2003/0214479 A1* 11/2003 Matsuda ................. G02F 1/167 345/107
2004/0252361 A1* 12/2004 Machida .............. G02B 26/026 359/296
2006/0119568 A1* 6/2006 Ikeda ................... G09G 3/3446 345/107
2006/0209008 A1* 9/2006 Nihei .................. G02F 1/16756 345/107
2007/0211330 A1* 9/2007 Ohshima ............. G02F 1/16756 359/296
2007/0268245 A1* 11/2007 Sugita ..................... G02F 1/167 345/107
2008/0231556 A1* 9/2008 Kretz ................... H10K 59/131 345/76
2009/0295765 A1 12/2009 Verschueren et al.
2010/0085628 A1* 4/2010 Lee ......................... G02F 1/167 359/296
2011/0261432 A1* 10/2011 Yamazaki ............. G02F 1/1677 359/296
2011/0285756 A1* 11/2011 Sato ..................... G09G 3/2003 345/107
2011/0286076 A1 11/2011 Lin et al.
2011/0304654 A1* 12/2011 Murayama ........... G09G 3/3446 345/107
2012/0182596 A1* 7/2012 Komatsu ................. G02F 1/167 359/296
2013/0050804 A1* 2/2013 No .......................... G02F 1/167 359/296
2013/0235018 A1* 9/2013 Tanaka ................. G09G 3/3446 345/212
2013/0250399 A1* 9/2013 Tanaka ................ G02F 1/16762 359/296
2014/0240211 A1 8/2014 Campisi
2019/0012016 A1* 1/2019 Kurasawa ........... G06F 3/04166
2023/0079869 A1* 3/2023 Lin ...................... G09G 3/2003
2023/0152656 A1 5/2023 Wang et al.

FOREIGN PATENT DOCUMENTS

CN 103926778 A 7/2014
CN 105590592 A 5/2016
CN 110300924 A 10/2019
WO 2019007083 A1 1/2019

* cited by examiner

ELECTRONIC PAPER DISPLAY DEVICE AND DRIVING METHOD THEREFOR

CROSS REFERENCE TO RELATED APPLICATIONS

This application is a national phase entry under 35 U.S.C. § 371 of International Application No. PCT/CN2021/132588, filed on Nov. 23, 2021, the entire content of which is incorporated herein by reference.

TECHNICAL FIELD

The disclosure relates to the field of display technology, in particular to an electronic paper display device and a driving method therefor.

BACKGROUND

Electronic paper display devices have attracted widespread attention due to their eye protection and low power consumption.

The electronic paper display device includes multiple micro-cups. Each micro-cup is encapsulated with electrophoretic particles of different colors. The multiple micro-cups are controlled to display different colors by controlling electrodes located on both sides of the micro-cup to generate vertical electric fields, thus achieving display. However, in the electronic paper display device of the related art, the micro-cup can display a certain color only when the electrophoretic particles in the micro-cup of the certain color move to a display side, but cannot display colors other than the color of electrophoretic particles.

SUMMARY

Embodiments of the disclosure provide an electronic paper display device. The electronic paper display device includes: a first base substrate and a plurality of sub-pixels arranged in an array on a side of the first base substrate. Each of the plurality of sub-pixels includes: a first electrode on the side of the first base substrate; a second electrode, on a side of the first electrode facing away from the first base substrate, where the second electrode includes a plurality of grooves passing through the second electrode along a thickness direction of the second electrode; orthographic projections of the plurality of grooves fall within an orthographic projection of the first electrode on the first base substrate; a microstructure, on a side of the second electrode facing away from the first base substrate, where the microstructure includes: a paper film micro-cavity, and a plurality of charged particles in the paper film micro-cavity; the plurality of charged particles include: a plurality of first color charged particles and a plurality of second color charged particles, where an electrical property of the first color charged particle is opposite to an electrical property of the second color charged particle; and a third electrode, on a side of the microstructure facing away from the second electrode.

In some embodiments, the microstructure further includes: transparent electrophoretic liquid in the paper film micro-cavity. The first electrode, the second electrode and the third electrode are light-transmitting electrodes.

In some embodiments, the plurality of charged particles further include: a plurality of third color charged particles in the paper film micro-cavity. An electrical property of the third color charged particles are same as the electrical property of the first color charged particle; and a charge to mass ratio of the first color charged particle is greater than a charge to mass ratio of the third color charged particle.

In some embodiments, the electronic paper display device further includes: a reflective layer on a side of the first base substrate facing away from the first electrode; and a color of the reflective layer is different from colors of all charged particles.

In some embodiments, in each of the second electrodes, the plurality of grooves extend along a first direction and are arranged along a second direction, or the plurality of grooves extend along a second direction and are arranged along a first direction. Here the first direction intersects the second direction.

In some embodiments, a shape of an orthographic projection of each of the plurality of grooves on the first base substrate is a stripe or a polygonal line.

In some embodiments, at least part of the plurality of grooves each includes: a first portion extending along a first direction; and a second portion extending along a second direction and connecting with the first portion.

In some embodiments, an orthogonal projection of the groove on the first base substrate is an arc. At least part of different grooves corresponds to different arc shapes with different radii; and centers of the arc shapes corresponding to the at least part of different grooves coincide with each other.

In some embodiments, an orthogonal projection of the groove on the first base substrate is a portion of an outline of a polygon. At least part of different grooves correspond to similar polygons, and centers of the polygons corresponding to the at least part of different grooves coincide with each other.

In some embodiments, the electronic paper display device further includes: a plurality of first scanning lines and a plurality of data lines crossing horizontally and vertically, a plurality of first signal lines, and a plurality of thin film transistors. The plurality of first scanning lines and a plurality of data lines divide areas where the plurality of sub-pixels are located; the plurality of thin film transistors are arranged one-to-one corresponding to the plurality of sub-pixels. The first scanning line is electrically connected with a gate electrode of the thin film transistor, the first signal line is electrically connected with the first electrode, the data line is electrically connected with a source electrode of the thin film transistor, and the second electrode is electrically connected with a drain electrode of the thin film transistor.

In some embodiments, the plurality of first scanning lines, the plurality of first signal lines and gate electrodes of the plurality of thin film transistors are formed of a same material and formed in a same process. The plurality of first scanning lines, the gate electrodes of the plurality of thin film transistors and the first electrode are arranged on a same side of a same film layer. The plurality of first signal lines are connected with the first electrode on the side of the first electrode facing away from the first base substrate; the plurality of data lines and source electrodes and drain electrodes of the plurality of thin film transistors are arranged in a same layer; and the plurality of data lines and source electrodes and drain electrodes of the plurality of thin film transistors are arranged between a layer where the plurality of first scanning lines are located and a layer where the second electrode is located.

In some embodiments, the plurality of first scanning lines and the plurality of first signal lines are alternately arranged.

In some embodiments, an orthographic projection of the thin film transistor on the first base substrate and the orthographic projection of the first electrode on the first base substrate do not overlap each other.

Embodiments of the disclosure provide a driving method for an electronic paper display device, including: determining a sub-pixel with a microstructure to be in a transparent state according to an image to be displayed; in a writing stage, providing driving signals to the first electrode, the second electrode, and the third electrode in the sub-pixel with the microstructure in the transparent state to drive a plurality of charged particles of different electrical properties sequentially to approach a bottom of a paper film micro-cavity of the microstructure, and drive charged particles near the bottom of the paper film micro-cavity to side walls of the paper film micro-cavity.

In some embodiments, in the writing stage, providing driving signals to the first electrode, the second electrode, and the third electrode in the sub-pixel with the microstructure in the transparent state to drive the plurality of charged particles of different electrical properties sequentially to approach the bottom of the paper film micro-cavity, and drive charged particles near the bottom of the paper film micro-cavity to the side walls of the paper film micro-cavity, includes:

in a first writing stage, providing a first level signal to the second electrode, and providing a second level signal to the third electrode to drive the first color charged particles to approach a display side of the electronic paper display device, and drive the second color charged particles to move towards the bottom of the paper film micro-cavity;

in a second writing stage, stopping to provide the second level signal to the third electrode, providing a third level signal to the first electrode, and providing a fourth level signal to the second electrode to drive the second color charged particles to approach the side walls of the paper film micro-cavity;

in a third writing stage, providing a fifth level signal to the second electrode, and providing the second level signal to the third electrode to drive the second color charged particles to move towards the display side of the electronic paper display device, and drive the first color charged particles to move towards the bottom of the paper film micro-cavity;

in a fourth writing stage, stopping to provide the second level signal to the third electrode, providing the third level signal to the first electrode, and providing a sixth level signal to the second electrode to drive the first color charged particles to approach the side walls of the paper film micro-cavity.

In some embodiments, the microstructure further includes a plurality of third color charged particles;

in the first writing stage, while providing the first level signal to the second electrode, and providing the second level signal to the third electrode to drive the first color charged particles closer to the display side of the electronic paper display device, the method further includes:

driving the third color charged particles to move towards o the display side of the electronic paper display device;

in the first writing stage, after providing the first level signal to the second electrode, and providing the second level signal to the third electrode to drive the first color charged particles to approach the display side of the electronic paper display device and drive the second color charged particles to move towards the bottom of the paper film micro-cavity, the method further includes:

keeping to provide the second level signal to the third electrode, and providing a seventh level signal to the second electrode to drive the first color charged particles to be located on a side of the third color charged particles facing away from the display side;

keeping to provide the second level signal to the third electrode, and providing an eighth level signal to the second electrode to drive the third color charged particles to approach the display side;

in the third writing stage, while driving the first color charged particles to move towards the bottom of the paper film micro-cavity, the method further includes:

driving the third color charged particles to move towards the bottom of the paper film micro-cavity;

in the fourth writing stage, while stopping to provide the second level signal to the third electrode, providing the third level signal to the first electrode, and providing the sixth level signal to the second electrode to drive the first color charged particles to approach the side walls of the paper film micro-cavity, the method further includes:

driving the third color charged particles to approach the side walls of the paper film micro-cavity.

BRIEF DESCRIPTION OF FIGURES

In order to more clearly illustrate the technical solutions in embodiments of the disclosure, a brief introduction will be given below to the drawings needed to be used in the description of embodiments. Obviously, the drawings in the following description are only some embodiments of the disclosure. Those of ordinary skill in the art can also obtain other drawings based on these drawings without exerting creative efforts.

DETAILED DESCRIPTION

Figure 1:
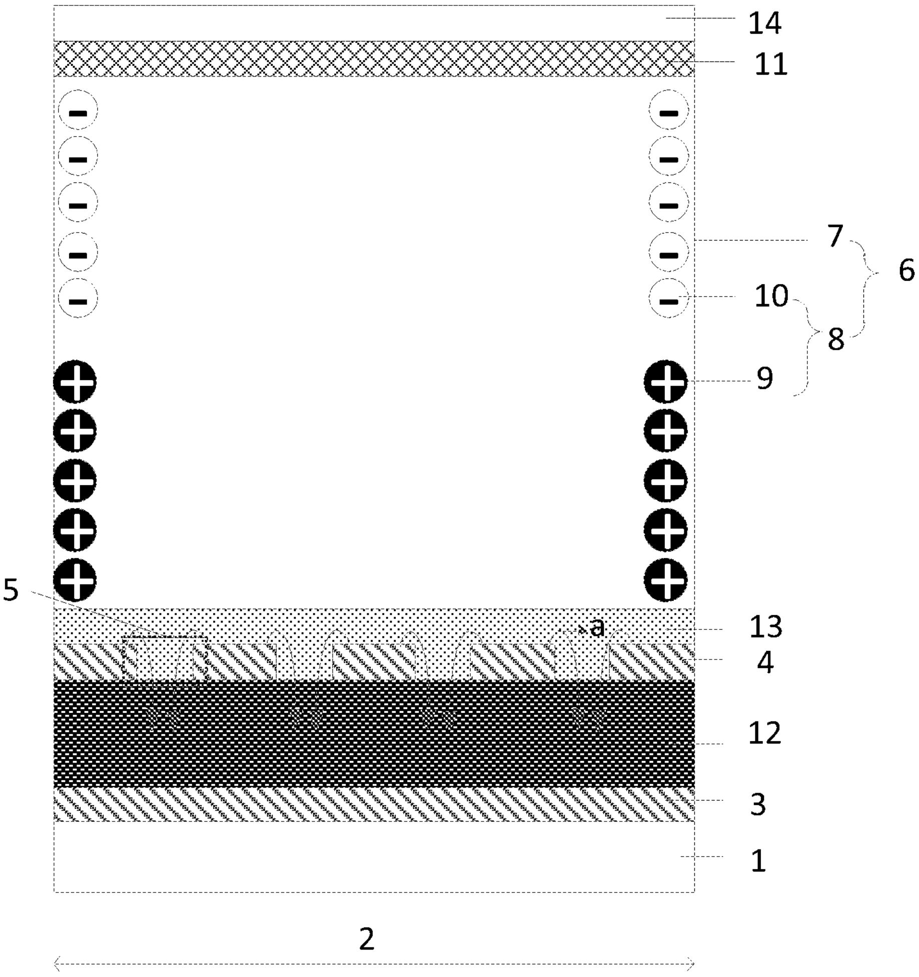
FIG. 1 is a schematic structural diagram of an electronic paper display device provided by an embodiment of the disclosure.

In order to make the purpose, technical solutions and advantages of embodiments of the disclosure more clear, the technical solutions of the embodiments of the disclosure will be clearly and completely described below in conjunction with the drawings of embodiments of the disclosure. Obviously, the described embodiments are some, but not all, of the embodiments of the disclosure. And the embodiments and features in the embodiments of the disclosure may be combined with each other without conflict. Based on the described embodiments of the disclosure, all other embodiments obtained by those of ordinary skill in the art without creative efforts fall within the scope of the disclosure.

Unless otherwise defined, technical terms or scientific terms used in this disclosure shall have the usual meaning understood by a person with ordinary skill in the art to which this disclosure belongs. Words such as "First", "second" used in the disclosure do not indicate any order, quantity or importance, but are only used to distinguish different components. Words such as "including" or "comprising" refer to the components or objects that appear before the word, including those listed after the word and their equivalents, without excluding other components or objects. Words such as "connected" or "connecting" are not limited to physical or mechanical connections, but may include electrical connections, whether direct or indirect.

It should be noted that the sizes and shapes of the figures in the drawings do not reflect true proportions and are only intended to illustrate the disclosure. And the same or similar reference numbers throughout represent the same or similar elements or elements with the same or similar functions.

An embodiment of the disclosure provides an electronic paper display device. As shown in FIG. 1, the electronic paper display device includes: a first base substrate 1 and a plurality of sub-pixels 2 arranged in an array on a side of the first base substrate 1; here each of the plurality of sub-pixel 2 includes:

a first electrode 3 on the side of the first base substrate 1;

a second electrode 4, on a side of the first electrode 3 facing away from the first base substrate 1, where the second electrode includes a plurality of grooves 5 passing through the second electrode along a thickness direction of the second electrode; orthographic projections of the plurality of grooves 5 fall within an orthographic projection of the first electrode 3 on the first base substrate 1;

a microstructure 6, on a side of the second electrode 4 facing away from the first base substrate 1, where the microstructure includes: a paper film micro-cavity 7, and a plurality of charged particles 8 in the paper film micro-cavity 7; the plurality of charged particles 8 include: a plurality of first color charged particles 9 and a plurality of second color charged particles 10; electrical properties of the plurality of first color charged particles 9 are opposite to electrical properties of the plurality of second color charged particles 10;

a third electrode 11, on a side of the microstructure 6 facing away from the second electrode 4.

In the electronic paper display device provided by the embodiment of the disclosure, the second electrode includes a plurality of grooves passing through the second electrode along a thickness direction of the second electrode. Voltages are applied to the first electrode and the second electrode, and a curved electric field can be formed between the second electrode and the first electrode. The curved electric field has a parallel component parallel to a plane where the electronic paper display device is located. The parallel component of the electric field is perpendicular to a side wall of the paper film micro-cavity. Therefore, under the action of the parallel component, the charged particles in the paper film micro-cavity move close to the side wall of the paper film micro-cavity. The charged particles close to the side wall of the paper film micro-cavity are invisible relative to a light-emitting side of the electronic paper display device, which can make the microstructure transparent. That is, the microstructures can show optical states beyond the color of charged particles, thereby enriching the optical effects of electronic paper display devices and enhancing user experience.

It should be noted that reference symbol "a" in FIG. 1 indicates a horizontal component of the electric field formed by the first electrode and the second electrode.

It should be noted that, as shown in FIG. 1, an insulating layer 12 is further disposed between the first electrode 3 and the second electrode 4.

It should be noted that in the electronic paper display device provided by the embodiments of the disclosure, a vertical electric field perpendicular to the first base substrate is formed between the second electrode and the third electrode. The vertical electric field can drive the charged particles to move in a direction perpendicular to the first substrate. That is, the charged particles can be driven to move towards the display side of the electronic paper display device, or move towards a side away from the display side of the electronic paper display device. When the first color charged particles approach the display side, the microstructure displays the first color. When the second color charged particles approach the display side, then the microstructure displays the second color. That is, the microstructure can present at least three optical states: a first color state, a second color state and a transparent state.

In some embodiments, the third electrodes in the plurality of sub-pixels are integrally connected. That is, the third electrode is a planar electrode covering multiple sub-pixel areas. In this case, the voltage signals applied to the third electrodes included in the plurality of sub-pixels are the same.

Of course, in some embodiments, the third electrodes in multiple sub-pixels may not be connected with each other. In this case, the voltage signals applied to the third electrodes in the plurality of sub-pixels may be the same or different.

In some embodiments, the microstructure further includes: transparent electrophoretic liquid in the paper film micro-cavity; and the first electrode, the second electrode and the third electrode are light-transmitting electrodes. Thus, the transparent state of microstructure can be achieved.

In some embodiments, a material of the first electrode, the second electrode, and the third electrode includes indium tin oxide (ITO).

In some embodiments, as shown in FIG. 1, the first color charged particles 9 are positively charged; the second color charged particles 10 are negatively charged.

In some embodiments, the first color charged particles are black charged particles, and the second color charged particles are white charged particles.

Figure 2:
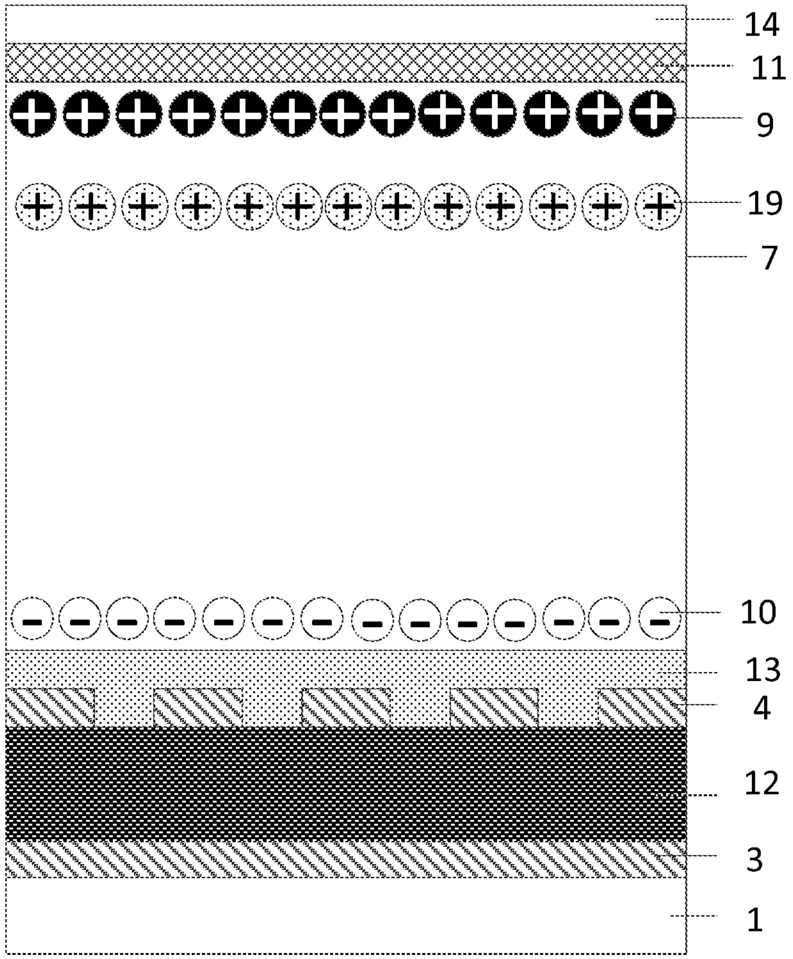
FIG. 2 is a schematic structural diagram of an electronic paper display device provided by another embodiment of the disclosure.

In some embodiments, as shown in FIG. 2, the plurality of charged particles 8 further include: a plurality of third color charged particles 19 in the paper film micro-cavity 7. An electrical property of the third color charged particle 19 is same as the electrical property of the first color charged particle 9; and a charge to mass ratio of the first color charged particle 9 is greater than a charge to mass ratio of the third color charged particle 19.

In some embodiments, as shown in FIG. 2, the first color charged particles 9 and the third color charged particles 19 are positively charged; the second color charged particles 10 are negatively charged.

In some embodiments, the first color charged particles are black charged particles, the second color charged particles are white charged particles, and the third color charged particles are colored charged particles.

In some embodiments, the colored charged particles are red charged particles or yellow charged particles.

Figure 3:
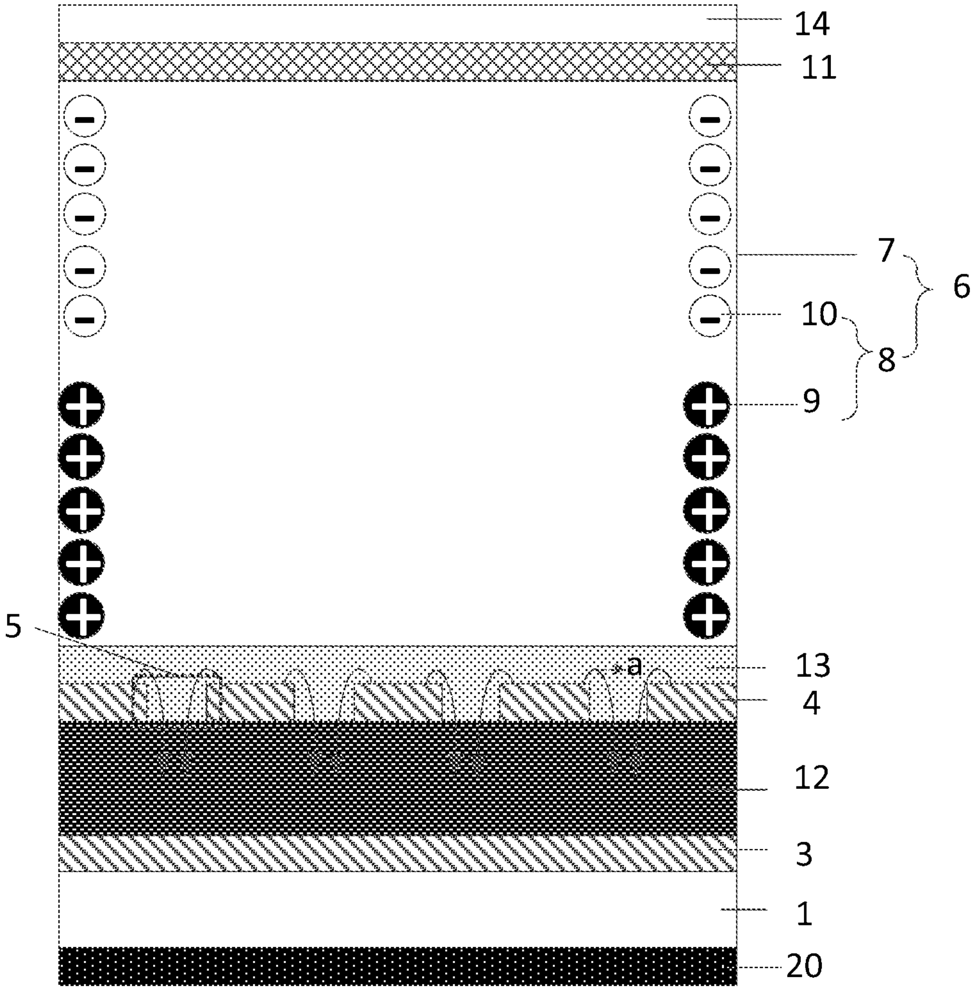
FIG. 3 is a schematic structural diagram of an electronic paper display device provided by another embodiment of the disclosure.

In some embodiments, as shown in FIG. 3, the electronic paper display device further includes: a reflective layer 20 on a side of the first base substrate 1 facing away from the first electrode 3; a color of the reflective layer 20 is different from colors of the charged particles 8.

That is, when the microstructure shows the transparent state, the sub-pixels corresponding to the microstructure shows the color of the reflective layer. This can increase the color types that can be presented by sub-pixels without increasing the types of charged particle colors, and avoid an increase in the difficulty of driving charged particles.

It should be noted that FIG. 2 takes the paper film micro-cavity that only includes first-color charged particles and second-color charged particles as an example. In some embodiments, when the paper film micro-cavity further includes the third color charged particles, the reflective layer can be provided on the side of the first base substrate facing away from the first electrode, and the color of the reflective layer is different from the colors of the first color charged particles, the second color charged particles and the third color charged particles.

In some embodiments, the color of the reflective layer is green. That is, the reflective layer shows green when exposed to external light. Of course, in some embodiments, the color of the reflective layer can be set according to actual needs.

In some embodiments, the reflective layers corresponding to different sub-pixels have the same color. That is, a reflective layer covers the entire surface of the side of the first base substrate facing away from the first electrode, thereby simplifying the process.

Of course, in some embodiments, the colors of the reflective layers corresponding to different sub-pixels are not completely the same. For example, the color of the reflective layer corresponding to a part of sub-pixels is a fourth color, and the color of the reflective layer corresponding to at least a part of sub-pixels among the remaining sub-pixels is a fifth color. As a result, the color types that can be displayed by the sub-pixels of the electronic paper display device can be further increased, and the display effect can be further improved.

Figure 4:
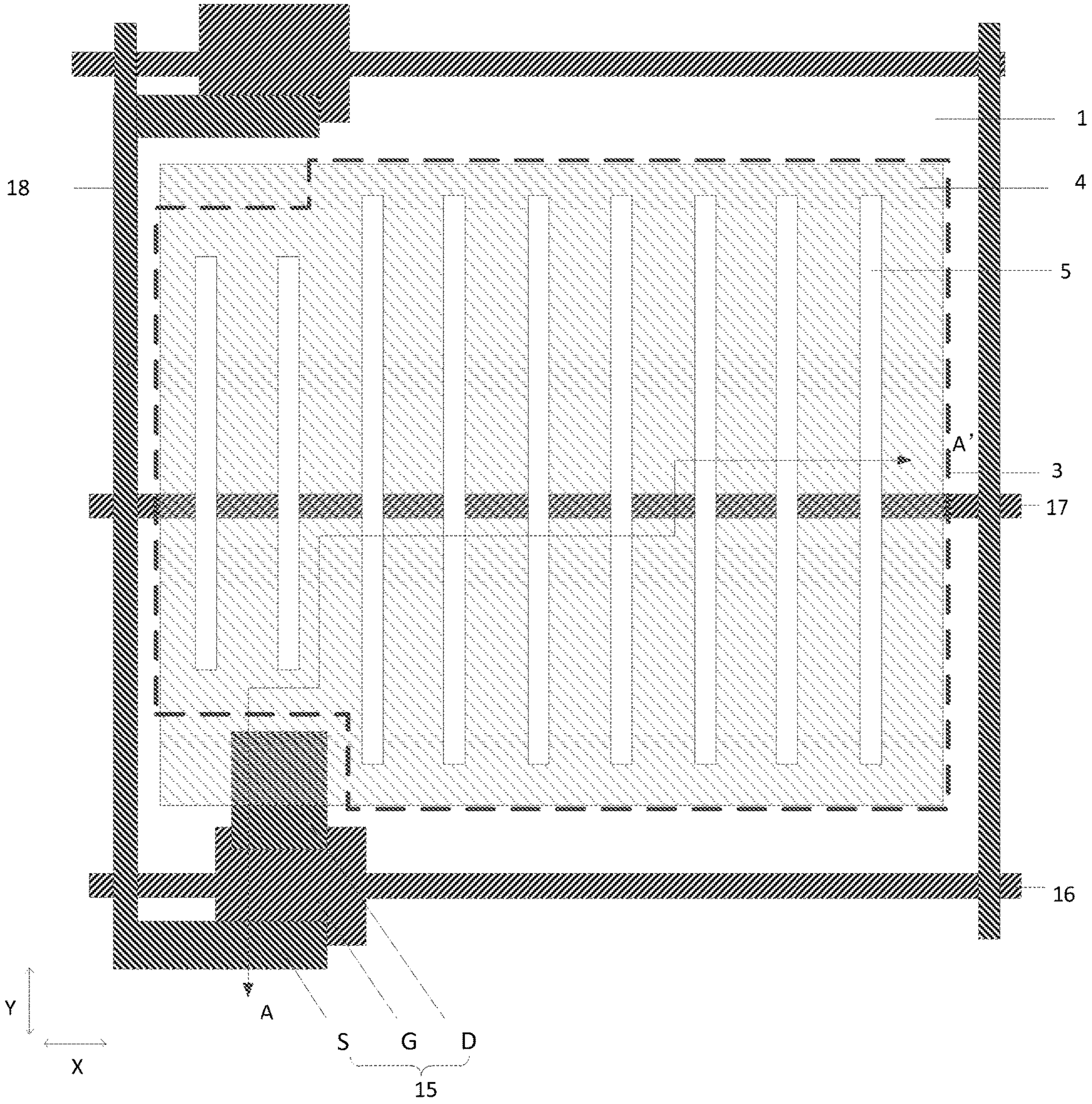
FIG. 4 is a schematic structural diagram of an electronic paper display device provided by another embodiment of the disclosure.

In some embodiments, as shown in FIG. 4, the electronic paper display device further includes: a plurality of first scanning lines 16 and a plurality of data lines 18 crossing horizontally and vertically, a plurality of first signal lines 17, and a plurality of thin film transistors 15. The plurality of first scanning lines 16 and the plurality of data lines 18 divide areas where the plurality of sub-pixels 2 are located; the plurality of thin film transistors 15 correspond in an one-to-one manner to the plurality of sub-pixels 2; the first scanning line 16 is electrically connected with a gate electrode G of the thin film transistor 15; the first signal line 17 is electrically connected with the first electrode 3; the data line 18 is electrically connected with a source electrode S of the thin film transistor 15; and the second electrode 4 is electrically connected with a drain electrode D of the thin film transistor 15.

In some embodiments, as shown in FIG. 4, the plurality of first scanning lines 16 and the plurality of first signal lines 17 extend along a second direction X and are arranged along a first direction Y, and the plurality of data lines 18 extend along the first direction Y and are arranged along the second direction X. As shown in FIG. 4, the second direction X is perpendicular to the first direction Y.

In some embodiments, when the scan signal from the first scan signal line controls the thin film transistor to turn on, the drive signal from data line data is provided to the second electrode through the thin film transistor, so that a voltage signal is provided to the second electrode. The signal from the first signal line is provided to the first electrode as a voltage signal.

It should be noted that, in addition to the first electrode and the second electrode forming an electric field having a horizontal component, the first electrode and the second electrode can form a storage capacitor due to the potential of the first electrode. As such, during the refresh scan gap in which the thin film transistor is turned off and the second electrode cannot be provided with a voltage through the data line, the storage capacitor formed by the first electrode and the second electrode can discharge to maintain the potential of the second electrode within one frame.

Figure 5:
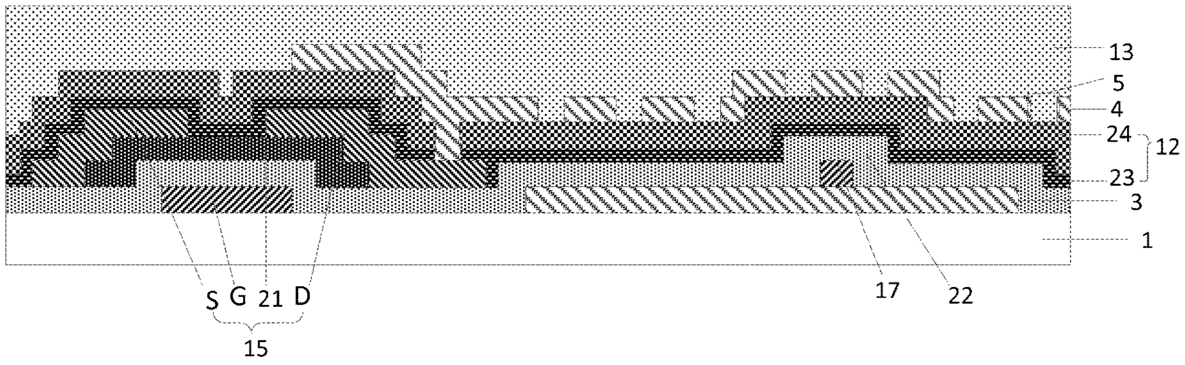
FIG. 5 is a cross-sectional view along AA' in FIG. 4 provided by an embodiment of the disclosure.

In some embodiments, as shown in FIGS. 4 and 5, the plurality of first scanning lines 16, the plurality of first signal lines 17 and gate electrodes G of the plurality of thin film transistors are formed by a same material and in a same process; the plurality of first scanning lines 16, the gate electrodes G of the plurality of thin film transistors and the first electrode 3 are arranged in a same side of a same film layer; the plurality of first signal lines 17 are connected with the first electrode 3 on the side of the first electrode 3 facing away from the first base substrate 1;

the plurality of data lines 18 and source electrodes S and drain electrodes D of the plurality of thin film transistors are arranged in a same layer; and the plurality of data lines 18 and source electrodes S and drain electrodes D of the plurality of thin film transistors are arranged between a layer where the plurality of first scanning lines 16 are located and a layer where the second electrode 4 is located.

In some embodiments, the plurality of first scanning lines, the plurality of first signal lines and the plurality of gate electrodes are formed in a same patterning process. For example, a first conductive layer covering the first base substrate and the first electrode is formed, and a patterning process is performed on the first conductive layer to form patterns of the plurality of first scanning lines, the plurality of first signal lines and the plurality of gate electrodes.

It should be noted that, FIG. 5 is a cross-sectional view along AA' in FIG. 4.

Figure 6:
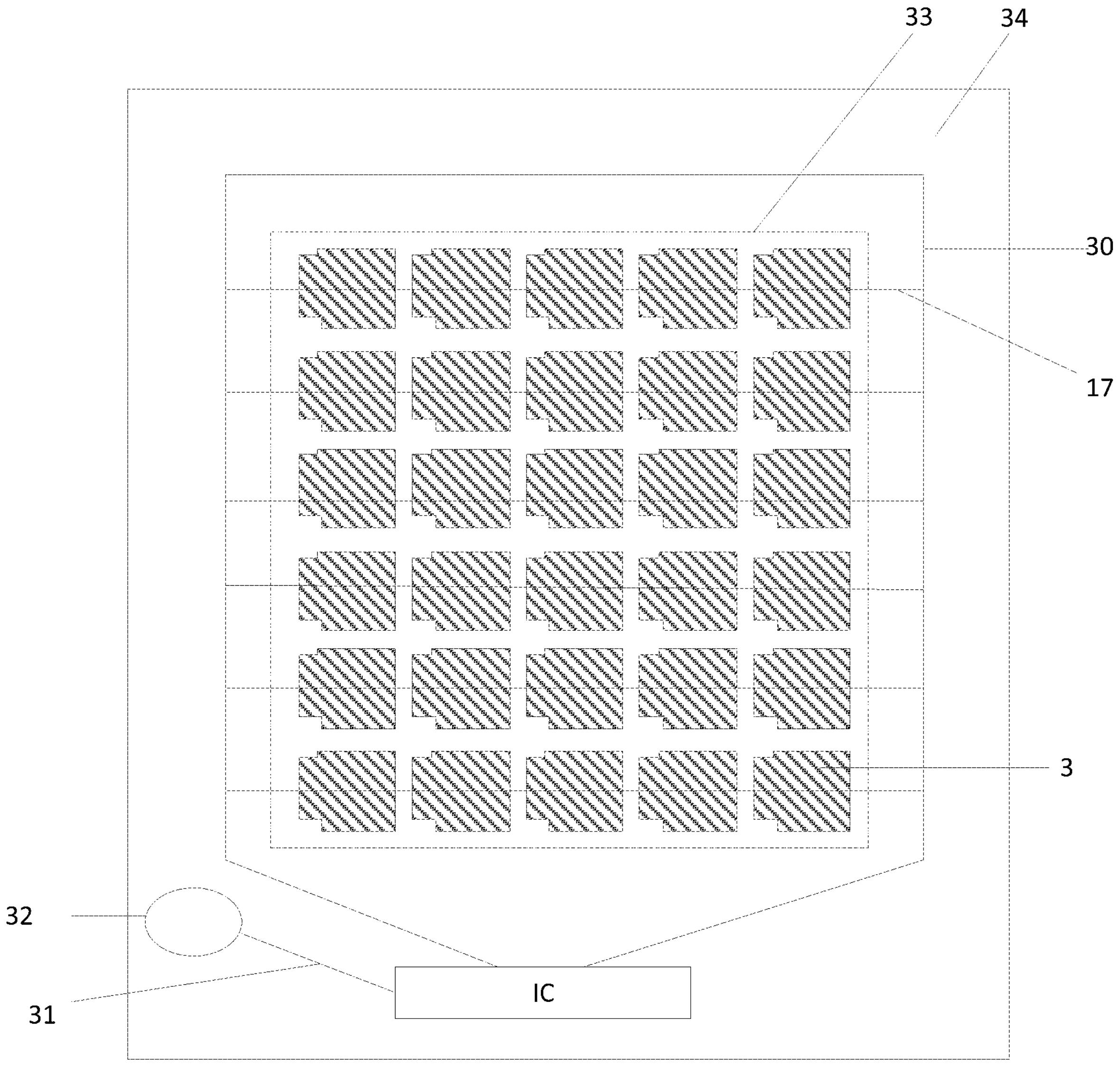
FIG. 6 is a schematic structural diagram of an electronic paper display device provided by another embodiment of the disclosure.

In some embodiments, as shown in FIG. 6, in the electronic paper display device provided by embodiments of the disclosure, the first electrodes 3 in each row of sub-pixels is electrically connected through one first signal line 17. As shown in FIG. 6, the electronic paper display device is divided into a display area 33 and a peripheral area 34 surrounding the display area 33. The plurality of sub-pixels are located in the display area 33. In the peripheral area, the electronic paper display device further includes a second signal line 30, a third signal line 31, a conductive silver glue 32, and a driver chip IC. In some embodiments, for example, only one second signal line 30 can be provided in the peripheral area 34, the second signal line 30 surrounds the display area 33 and both ends of the second signal line 30 are electrically connected with the driving signal IC, and the plurality of first signal lines 17 are all electrically connected with the second signal line 30. In some embodiments, for example, the second signal line 30 is arranged in the same layer as the source electrode and the drain electrode of the thin film transistor, and the second signal line 30 is electrically connected with the first signal line 17 through a via hole. In some embodiments, one end of the third signal line 31 is electrically connected with the driver chip IC, the other end of the third signal line 31 is electrically connected with the conductive silver glue 32, and the conductive silver glue is further electrically connected with the third electrodes (not shown in figures). Thus, the driver chip IC can provide signals to the third electrodes through the third signal line and conductive silver glue. That is, in the electronic paper display device provided by embodiments of the disclosure, the first electrode and the third electrode are not connected, and signals can be provided to the first electrode and the third electrode respectively through the driver chip.

It should be noted that, FIG. 5 illustrates the first scanning line 16 and the gate G of the thin film transistor and first electrode 3 arranged on the same side of the first substrate 1 as an example. In some embodiments, a buffer layer may further be arranged between the first base substrate and the first electrode, that is, the first scanning line, the gate electrodes of the thin film transistors, and the first electrodes are arranged on a side of the buffer layer facing away from the first base substrate.

In some embodiments, as shown in FIG. 5, in the electronic paper display device provided by embodiments of the disclosure, a pattern of the first electrode is first formed, and then the patterns of the first scanning lines, the first signal lines and the gate electrodes are formed. In this way, the first electrode is formed on a flat surface, and the formed first electrode is provided with a flat surface to ensure the conductive performance of the first electrode. In addition, the first signal lines formed subsequently can be electrically connected with the first electrode by directly contacting the first electrode on the side of the first electrode facing away from the base substrate, thus the process is simple and easy to implement. Of course, in some embodiments, the first scanning lines, the gate electrodes of the thin film transistors and the first signal lines may be formed first, and then the first electrode is formed, that is, the first electrode covers part of the first signal lines.

In some embodiments, as shown in FIG. 5, the thin film transistor 15 further includes an active layer 21, and the source electrode S and the drain electrode D are in contact with the active layer 21 on a side of the active layer 21 facing away from the first base substrate 1. As shown in FIG. 5, the thin film transistor 15 is a thin film transistor with a bottom gate structure. As shown in FIG. 5, the insulating layer 12 includes: a passivation layer 23 arranged between the source electrode S and the second electrode 4, and a resin layer 24 arranged between the passivation layer 23 and the second electrode 4. The electronic paper display device further includes: a gate insulating layer 22 arranged between the gate electrode G and the active layer 21, and a protective layer 13 arranged between the second electrode 4 and the microstructure. The second electrode 4 is electrically connected with the drain electrode D through a via hole passing through the resin layer 24 and the passivation layer 23.

In some embodiments, as shown in FIG. 4, the source S and the drain D of the thin film transistor are respectively at two sides of the first scanning line 16. The orthographic projection of the second electrode 4 on the first base substrate overlaps with the orthographic projection of the drain electrode D on the first base substrate, that is, the second electrode 4 covers a part of the thin film transistor 15. Thus, the sub-pixel aperture ratio can be improved.

In some embodiments, as shown in FIG. 4, the plurality of first scanning lines 16 and the plurality of first signal lines 17 are alternately arranged.

In some embodiments, the first signal line is in contact with the first electrode, so the first signal line overlaps with the opening area of the sub-pixel.

In some embodiments, as shown in FIG. 4, the orthographic projection of the thin film transistor 15 on the first base substrate does not overlap with the orthographic projection of the first electrode 3 on the first base substrate.

Figure 7:
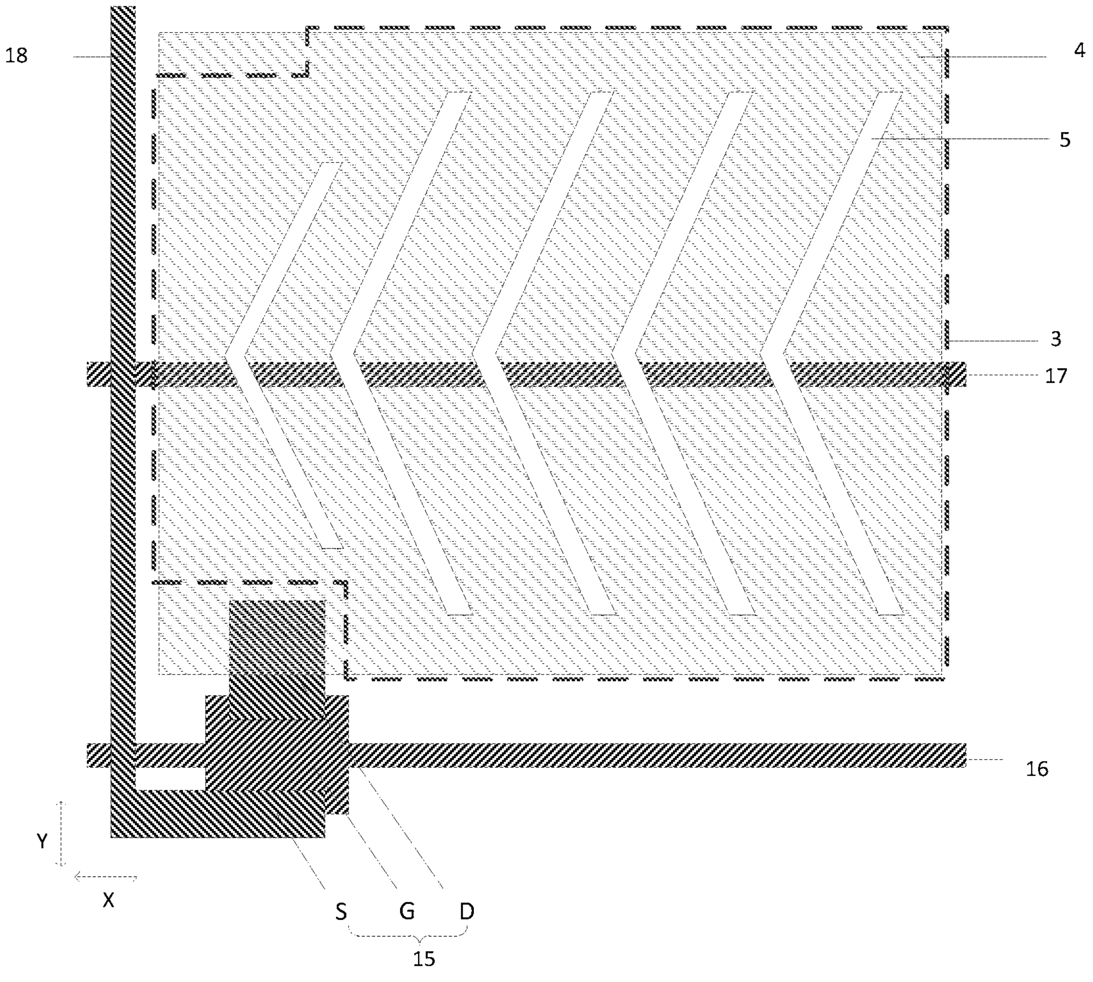
FIG. 7 is a schematic structural diagram of an electronic paper display device provided by another embodiment of the disclosure.
Figure 8:
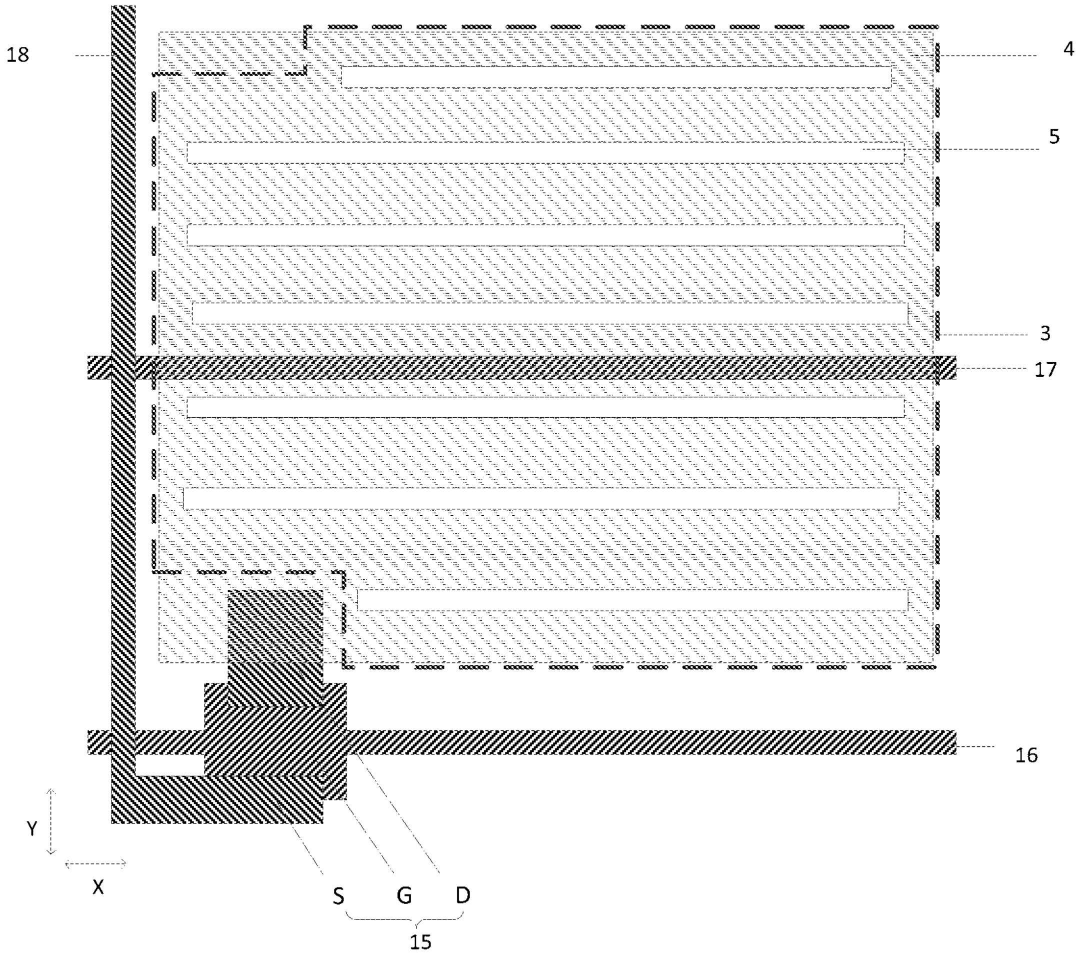
FIG. 8 is a schematic structural diagram of an electronic paper display device provided by another embodiment of the disclosure.

In some embodiments, as shown in FIGS. 4 and 7, in each second electrode 4, a plurality of grooves 5 extend along the first direction Y and are arranged along the second direction X; or, as shown in FIG. 8, the plurality of grooves 5 extend along the second direction X and are arranged along the first direction Y. Here, the first direction Y intersects the second direction X.

It should be noted that, as shown in FIGS. 4 and 7, the first direction Y is the extension direction of the data lines, and the second direction X is the extension direction of the scanning lines. In some embodiments, the first direction Y and the second direction X may be other directions that intersect each other.

In some embodiments, the plurality of grooves are all equal in width, and the distance between any adjacent grooves is equal.

In some embodiments, as shown in FIGS. 4, 7, and 8, a shape of an orthographic projection of the groove 5 on the first base substrate is a stripe or a polygonal line. As shown in FIGS. 4 and 8, the shape of the orthographic projection of the groove 5 on the first base substrate is the stripe. As shown in FIG. 7, the shape of the orthographic projection of the groove 5 on the first base substrate is the polygonal line.

Figure 9:
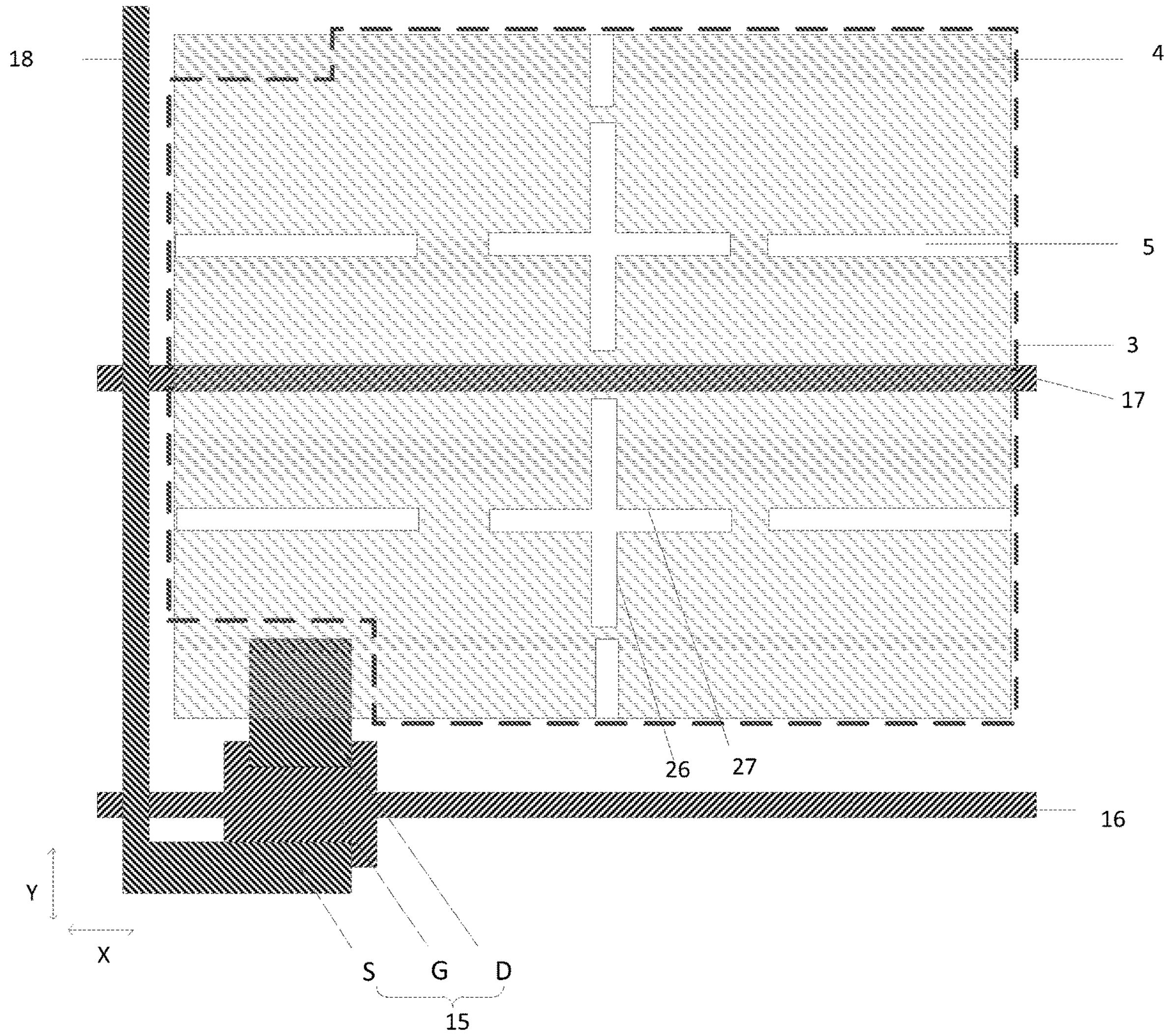
FIG. 9 is a schematic structural diagram of an electronic paper display device provided by another embodiment of the disclosure.

In some embodiments, as shown in FIG. 9, at least part of the plurality of grooves 5 includes a first portion 26 extending along the first direction Y, and a second portion 27 extending along the second direction X and connecting with the first portion.

In some embodiments, as shown in FIG. 9, the orthographic projection of the first portion 26 extending along the first direction Y and the orthographic projection of the second portion 27 extending along the second direction X and connecting with the first portion 26 on the first base substrate form a cross shape. As shown in FIG. 9, the plurality of grooves 5 further include: stripe-shaped grooves extending along the first direction Y, and stripe-shaped grooves extending along the second direction X. As shown in FIG. 9, the orthographic projections of the grooves 5 on the first base substrate form rectangular outlines, and a center of the cross-shaped groove 5 is located at the vertex of the rectangle outline. The cross-shaped groove 5 and the strip-shaped groove 5 divide the second electrode 4 into a plurality of connected sub-electrodes arranged in an array.

In some embodiments, a width of the first portion is equal to a width of the second portion, and the width of the first portion is equal to a width of the strip-shaped groove extending along the first direction, and the width of the second portion is equal to a width of the strip-shaped groove extending along the second direction.

Figure 10:
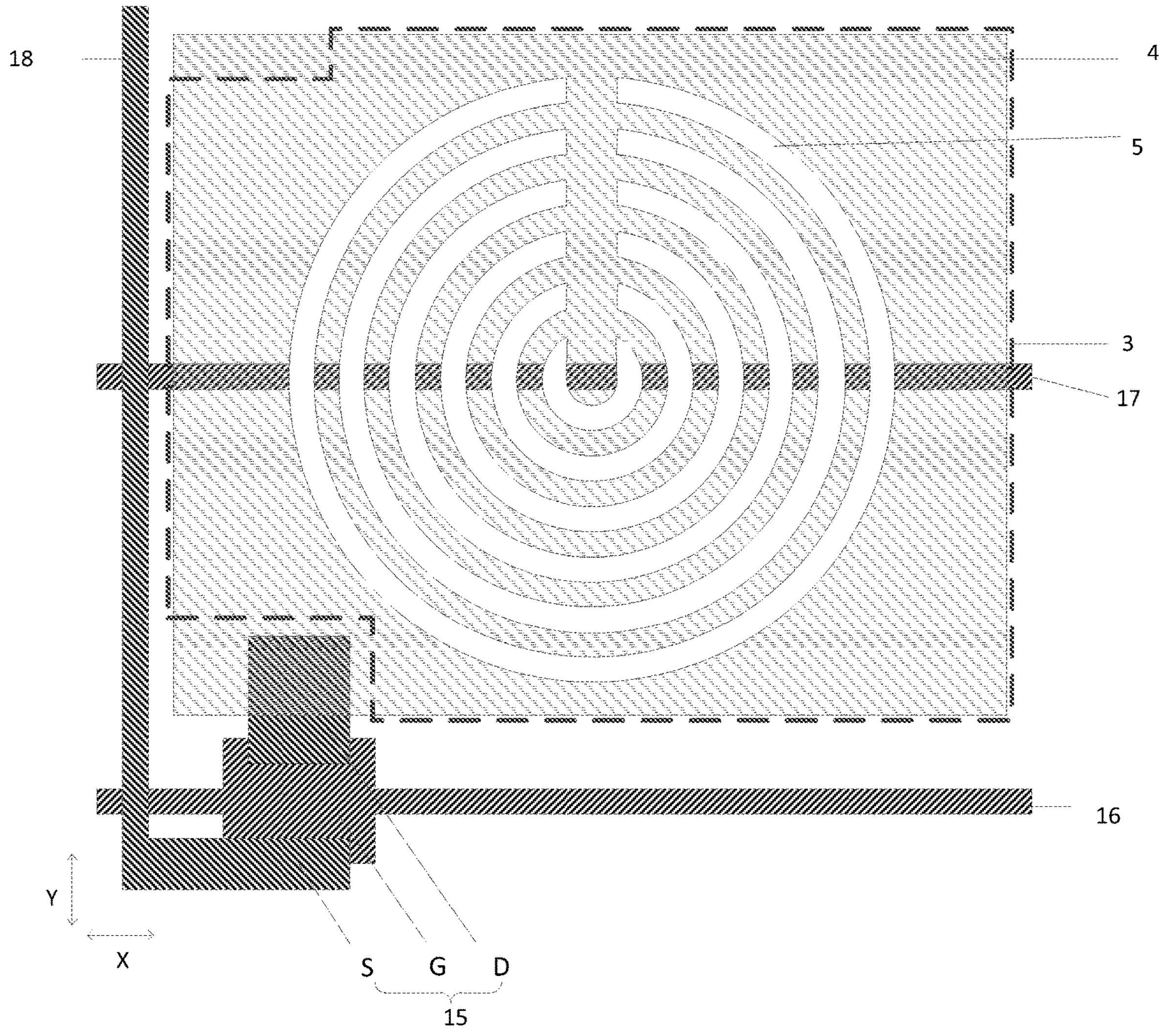
FIG. 10 is a schematic structural diagram of an electronic paper display device provided by another embodiment of the disclosure.

In some embodiments, as shown in FIG. 10, the orthographic projection of the groove 5 on the first base substrate is arc-shaped; at least part of the plurality of grooves 5 which are different correspond to different arc shapes with different radii; and centers of the arc shapes corresponding to the plurality of grooves 5 coincide with each other.

In some embodiments, as shown in FIG. 10, different grooves 5 correspond to different arc shapes with different radii. As shown in FIG. 10, the pattern of each groove is a circle with a break. For example, the widths of the breaks of different circles in the second direction X are equal.

Of course, in some embodiments, there are some grooves corresponding to arc shapes with the same radius.

In some embodiments, the widths of the plurality of grooves are equal along the extending direction of the radius of the arc shape. Among multiple grooves corresponding to arc shapes with different radii, the distance between any two adjacent grooves is equal.

Figure 11:
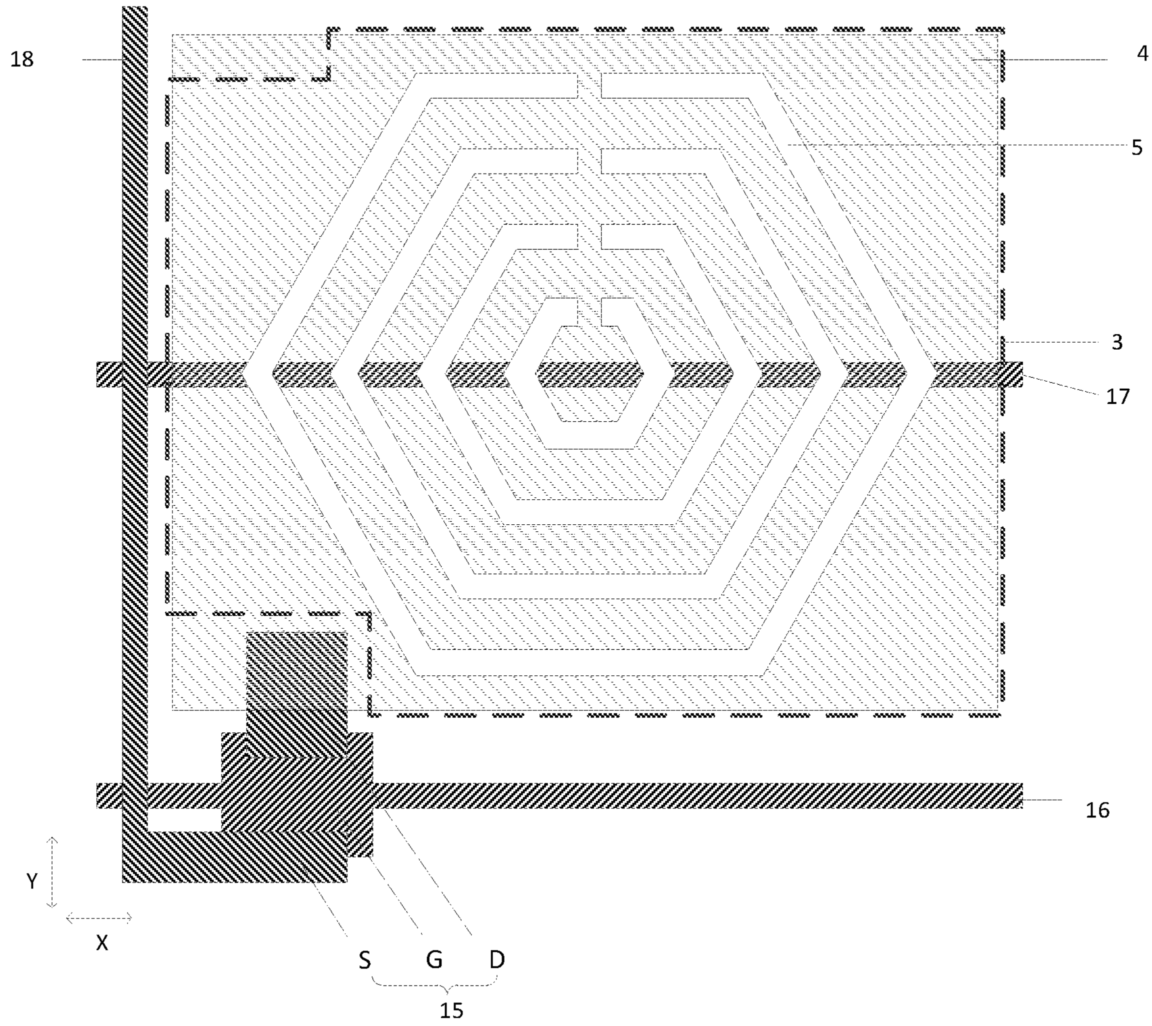
FIG. 11 is a schematic structural diagram of an electronic paper display device provided by another embodiment of the disclosure.

In some embodiments, as shown in FIG. 11, an orthogonal projection of the groove 5 on the first base substrate is a portion of a polygon; at least part of the plurality of grooves 5 corresponds to similar polygons, and centers of the polygons corresponding to the plurality of grooves 5 coincide with each other.

In some embodiments, as shown in FIG. 11, the polygons corresponding to different grooves 5 are similar. That is, different grooves correspond to polygons with different outlines. In some embodiments, some of the grooves may be set to be on the outline of a same polygon.

In some embodiments, as shown in FIG. 11, the patterns of different grooves 5 are annular shapes with polygonal outlines, and the annular shapes of polygonal outlines have breaks. For example, in a direction from the center of the polygon to the outline, the widths of different grooves are equal, and the distance between any two adjacent grooves is equal.

In some embodiments, as shown in FIG. 11, the polygon corresponding to the groove is a regular pentagon. Of course, the polygon corresponding to the groove can also be a triangle, rectangle, hexagon, etc.

In some embodiments, as shown in FIG. 11, the polygon corresponding to the groove is a regular polygon.

In some embodiments, as shown in FIG. 4 and FIGS. 7 to 11, the second electrode 4 is a block electrode, that is, a shape of the orthographic projection of the second electrode on the first base substrate is a rectangle.

In some embodiments, as shown in FIG. 4 and FIGS. 7 to 11, the second electrode 4 is integral in the area except for the grooves 5.

Figure 12:
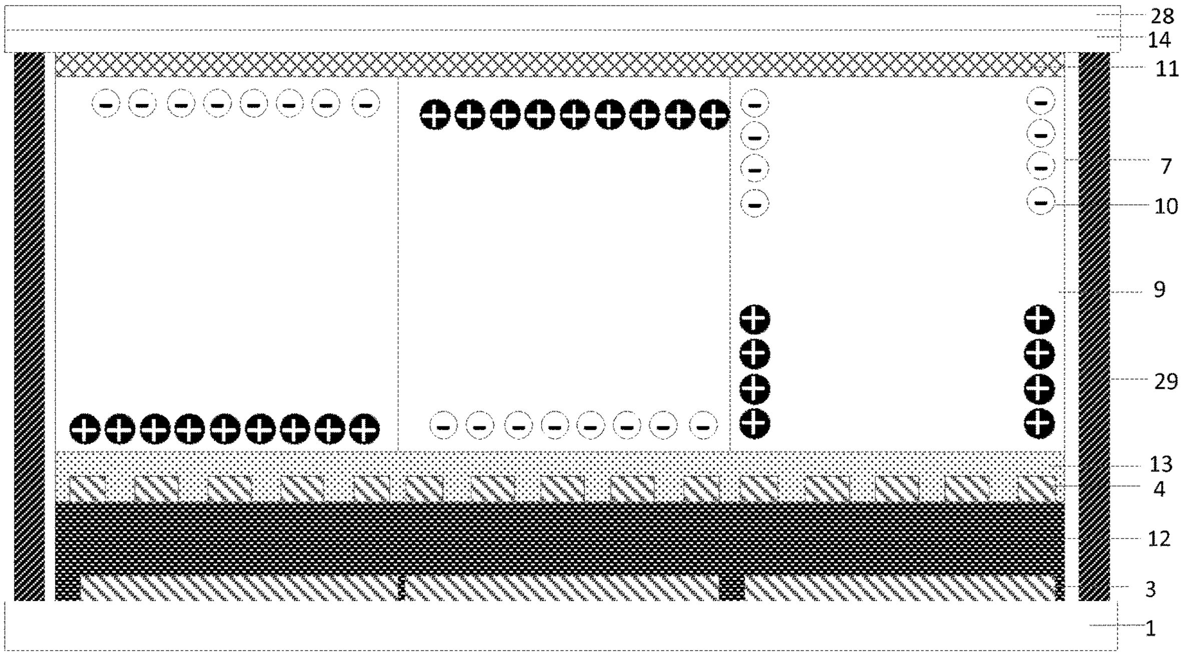
FIG. 12 is a schematic structural diagram of an electronic paper display device provided by another embodiment of the disclosure.

In some embodiments, as shown in FIG. 12, the electronic paper display device further includes: a second base substrate 14 on a side of the third electrode 11 facing away from the first base substrate 1, a waterproof protective film 28 on a side of the second base substrate 14 facing away from the third electrode 11, and a sealing glue 29 arranged between the second base substrate 14 and the first base substrate 1 and surrounding the sub-pixels.

In some embodiments, the second base substrate may be a flexible substrate. For example, the material of the second base substrate includes polyethylene glycol terephthalate (PET).

In some embodiments, as shown in FIGS. 1, 3, and 12, the paper film micro-cavity can be in the shape of a paper film micro-cup. In some embodiments, a width of the paper film micro-cavity in a direction parallel to the base substrate and a height of the paper film micro-cavity in a direction perpendicular to the base substrate are on the order of 100 microns. For example, the height of the paper film micro-cavity in the direction perpendicular to the base substrate is 150 microns. The cross-section of the paper film micro-cavity in the direction parallel to the base substrate is square, and the side length of the square is 150 microns. The thickness of the paper film is on the order of 10 microns. The size of charged particles is on the order of 100 nanometers. The total thickness aggregated charged particles in the paper film micro-cavity is less than 10 microns.

Figure 13:
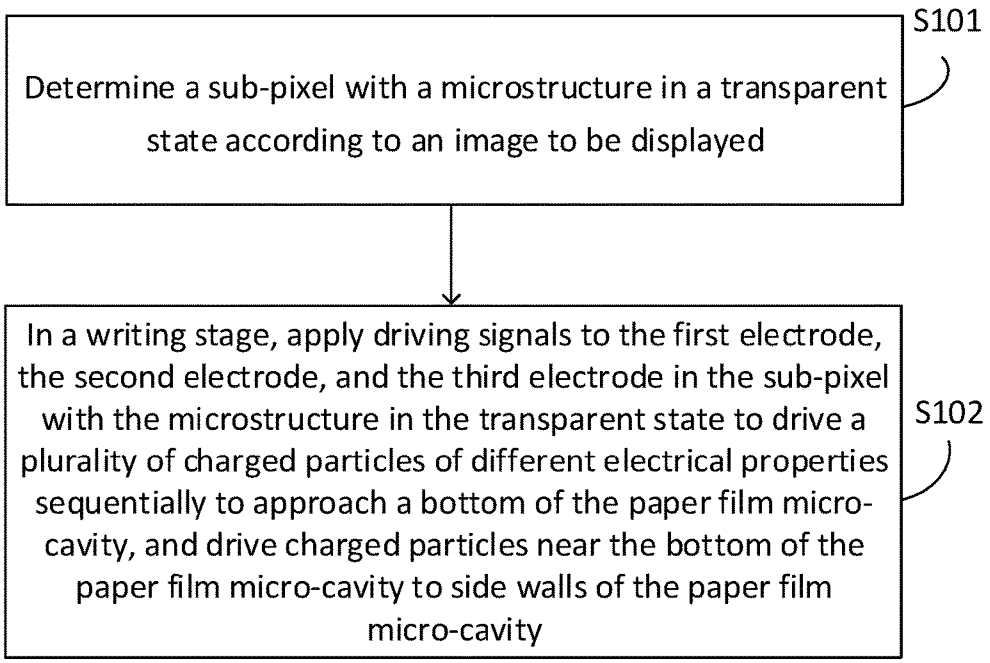
FIG. 13 is a schematic diagram of a method for driving an electronic paper display device provided by an embodiment of the disclosure.

Based on the same inventive concept, embodiments of the disclosure also provide a method for driving the above-mentioned electronic paper display device, as shown in FIG. 13, including:

- S101: determine a sub-pixel with a microstructure to be in a transparent state according to an image to be displayed;
- S102: in a writing stage, provide driving signals to the first electrode, the second electrode, and the third electrode in the sub-pixel with the microstructure to be in the transparent state to drive charged particles of different electrical properties sequentially to approach a bottom of a paper film micro-cavity of the microstructure, and drive charged particles near the bottom of the paper film micro-cavity to side walls of the paper film micro-cavity.

Based on the method for driving the electronic paper display device provided by embodiments of the disclosure, drive charged particles of different electrical properties can be sequentially driven to approach the bottom of the paper film micro-cavity, and then the charged particles closer to the bottom of the paper film micro-cavity can be driven to the side walls of the paper film micro-cavity by providing driving signals to the first electrode, the second electrode, and the third electrode. Thus, the charged particles close to the side walls of the paper film micro-cavity are invisible relative to the display side of the electronic paper display device, which can make the microstructure transparent, enrich the optical effects of electronic paper display devices and improve user experience.

In some embodiments, in the writing stage, providing driving signals to the first electrode, the second electrode, and the third electrode in the sub-pixel with the microstructures in the transparent state to drive charged particles of different electrical properties sequentially to approach a bottom of a paper film micro-cavity, and drive charged particles near the bottom of the paper film micro-cavity to side walls of the paper film micro-cavity, includes:

- in a first writing stage T1, providing a first level signal V1 to the second electrode 4, and providing a second level signal to the third electrode 11, to drive the first color charged particles 9 to approach a display side of the electronic paper display device, and drive the second color charged particles 10 to move towards the bottom of the paper film micro-cavity 7;

in a second writing stage T2, stopping to provide the second level signal to the third electrode 11, providing a third level signal to the first electrode 3, and providing a fourth level signal V2 to the second electrode 4 to drive the second color charged particles 10 to approach the side walls of the paper film micro-cavity 7;

in a third writing stage T3, providing a fifth level signal V3 to the second electrode 4, and providing the second level signal to the third electrode 11, to drive the second color charged particles 10 to move towards the display side of the electronic paper display device, and drive the first color charged particles 9 to move towards the bottom of the paper film micro-cavity 7;

in a fourth writing stage T4, stopping to provide the second level signal to the third electrode 11, providing the third level signal to the first electrode 3, and providing a sixth level signal V4 to the second electrode 4 to drive the first color charged particles 9 to approach the side wall of the paper film micro-cavity 7.

After the first writing stage to the fourth writing stage, the first color charged particles and the second color charged particles a are both driven to the sidewall of the paper film micro-cavity under the action of a horizontal electric field, making the microstructure transparent.

It should be noted that, the curvilinear electric field formed between the first electrode and the second electrode has a small range of action, and the film thickness of the under the action of the electric field with the horizontal component is about 2 microns, which is smaller than the vertical thickness of the paper film micro-cavity. Therefore, the electric field with a horizontal component is not sufficient to affect the charged particles at the top of the paper film micro-cavity (i.e. the display side), thus it is necessary to drive the charged particles to approach the bottom of the paper film micro-cavity. In the first writing stage, an electric field is formed between the third electrode and the second electrode in a direction perpendicular to the base substrate. Due to the opposite electrical properties of the first color charged particle and the second color charged particle, the first color charged particle moves towards the display side, while the second color charged particle moves away from the display side, that is, the second color charged particle moves towards the bottom of the paper film micro-cavity. The second colored charged particles are laid flat on the bottom of the paper film micro-cavity, so that during the second writing stage, the second colored charged particles are driven to approach the side walls of the paper film micro-cavity. In the third writing stage, the second colored charged particle are still driven to the side wall of the paper film micro-cavity and moves towards the display side, while the first colored charged particle moves to a side facing away from the display side, that is, the first colored charged particle is driven to move towards the bottom of the paper film micro-cavity. In this case, the first colored charged particles are laid flat at the bottom of the paper film micro-cavity, so that in the fourth writing stage, the first colored charged particles are driven to approach the side walls of the paper film micro-cavity.

Figure 14:
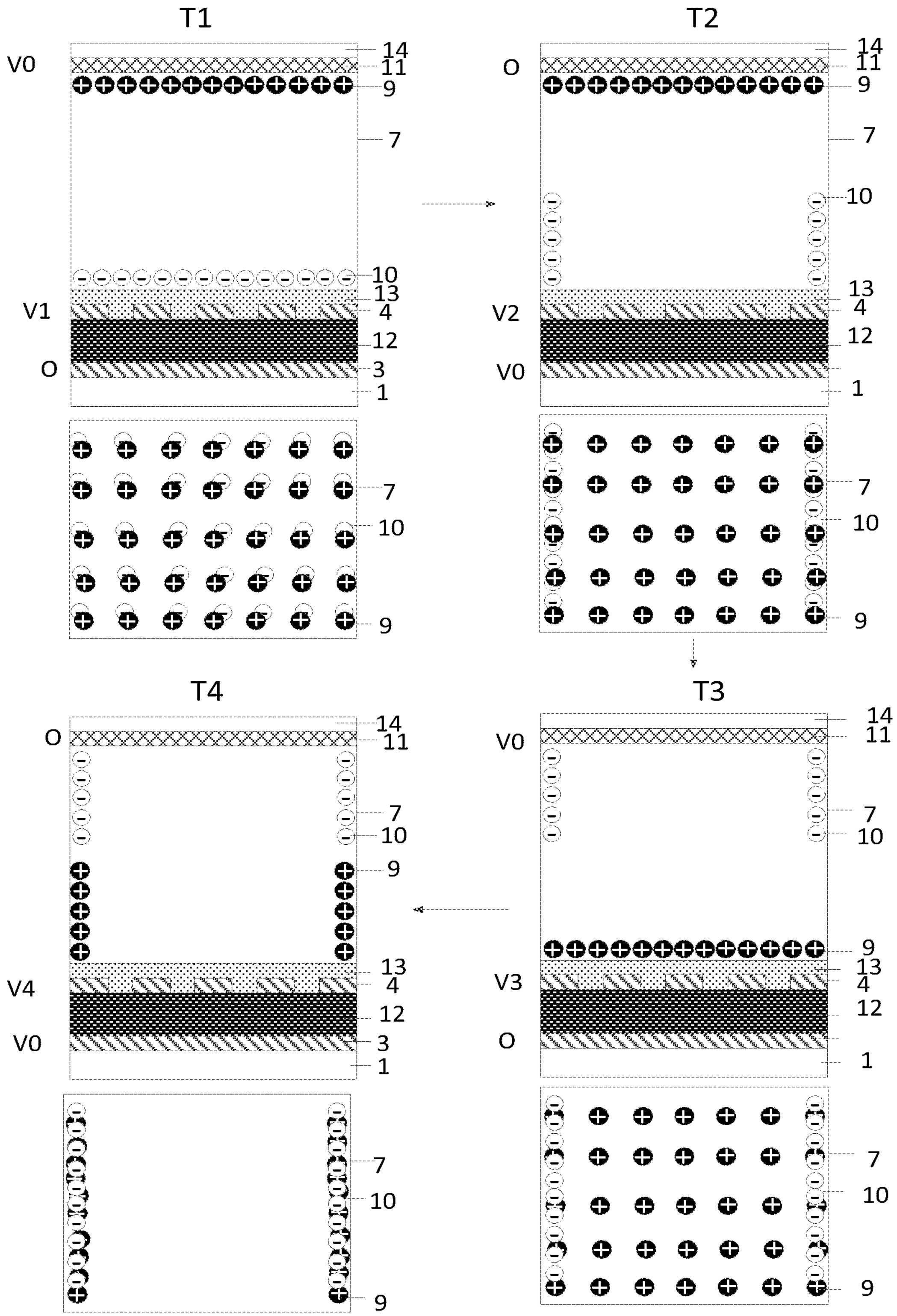
FIG. 14 is a schematic diagram of a method for driving an electronic paper display device provided by another embodiment of the disclosure.

In some embodiments, the voltage values of the second level signal and the third level signal are equal. In some embodiments, the voltage values of the second level signal and the third level signal are greater than or equal to −2 V and less than or equal to 0 V. In some embodiments, as shown in FIG. 14, both the second level signal and the third level signal are zero-voltage signals V0; that is, the zero-voltage signal is applied to the third electrode during the first writing stage and the third writing stage. And, the zero-voltage signal is applied to the first electrode during the second writing stage and the fourth writing stage.

In some embodiments, during the first writing stage, a zero-voltage signal may be provided to the first electrode, while a first level signal is provided to the second electrode, and a zero-voltage signal is provided to the third electrode.

In some embodiments, as shown in FIG. 14, in the third writing stage T3, the zero-voltage signal provided to the first electrode 11 is stopped, while providing the fifth level signal V3 to the second electrode 4 and providing the zero-voltage signal V0 to the third electrode 11.

In some embodiments, during the first writing stage and the third writing stage, a zero-voltage signal may be provided to the first electrode, or no driving signal may be provided to the first electrode. Providing a driving signal to the first electrode will not affect the main action result of the vertical electric field formed by the second electrode and the third electrode. Although local charged particles on the bottom of the paper film micro-cavity may be pushed to side walls, the electric field for pushing to side walls is weaker compared with the vertical electric field. In response to the electric field, the charged particles will move out of the coverage range of the horizontal component electric field away from the bottom of the paper film micro-cavity in the vertical direction. Therefore, the charged particles can be normally laid flat on the display side to display the first or second color.

It should be noted that, the second colored charged particles that have been pushed to the side wall in the third writing stage can move vertically to the display side, because the second colored charged particles have been aggregated on the side wall of the paper film micro-cavity in the second writing stage. Therefore, during the upward movement in the third writing stage, the aggregation state of the second colored charged particles on the side wall will not be broken.

It should be noted that "O" in FIG. 14 indicates stopping the providing of drive signals to the electrodes.

It should be noted that, in FIG. 14, the second color charged particles are first pushed sideways to the side wall of the paper film micro-cavity as an example for illustration. In some embodiments, when the paper film micro-cavity includes the two kinds charged particles which are first color charged particles and second color charged particles, the first color charged particles can be firstly driven to the side wall of the paper film micro-cavity. That is, in the first writing stage, a driving signal is provided to the third electrode and the second electrode to drive the second color charged particles to approach the display side of the electronic paper display device, and at the same time, drive the first color charged particles toward the bottom of the paper film micro-cavity. In the second writing stage, stop providing the driving signal to the third electrode, and provide the driving signal to the first electrode and the second electrode, to allow the first color charged particles to be driven to the side wall of the paper film micro-cavity. In the third writing stage, stop providing the driving signal to the first electrode, and provide the driving signal to the third electrode and the second electrode, to allow the first color charged particles to move toward the display side of the electronic paper display device, and the second color charged particles to be driven toward the bottom of the paper film micro-cavity. In the fourth writing stage, stop providing the driving signal to the third electrode, and provide the driving signal to the first electrode and the second electrode, so that the second-color charged particles approach the side wall of the paper film micro-cavity.

In some embodiments, the electrical properties of the first level signal and the sixth level signal are the same as the electrical properties of the first color charged particles, and the absolute value of the voltage of the first level signal is greater than the absolute value of the voltage of the sixth level signal.

The electrical properties of the fourth level signal and the fifth level signal are the same as the electrical properties of the second color charged particles, and the absolute value of the voltage of the fifth level signal is greater than the absolute value of the voltage of the fourth level signal.

The absolute voltage value of the first level signal is equal to the absolute voltage value of the fifth level signal, and the absolute voltage value of the fourth level signal is equal to the absolute voltage value of the sixth level signal.

In some embodiments, the absolute value of the voltage of the sixth level signal is smaller than the absolute value of the voltage of the first level signal and the absolute value of the fifth level signal. That is, compared with driving the charged particles to the display side, a voltage with the smaller amplitude can be used to drive the charged particles to the side walls of the paper membrane micro-cavity, which can save power consumption.

In some embodiments, the first level signal is 15 V, the fourth level signal is-5 V, the fifth level signal is-15 V, and the sixth level signal is 5 V.

In some embodiments, based on the image to be displayed, for a sub-pixel for displaying a first color, during the writing stage, a zero-voltage signal is provided to the third electrode, and a first level signal is provided to the second electrode. Based on the image to be displayed, for a sub-pixel for displaying a second color, during the writing stage, a zero-voltage signal is provided to the third electrode and a fifth level signal is provided to the second electrode.

Figure 15:
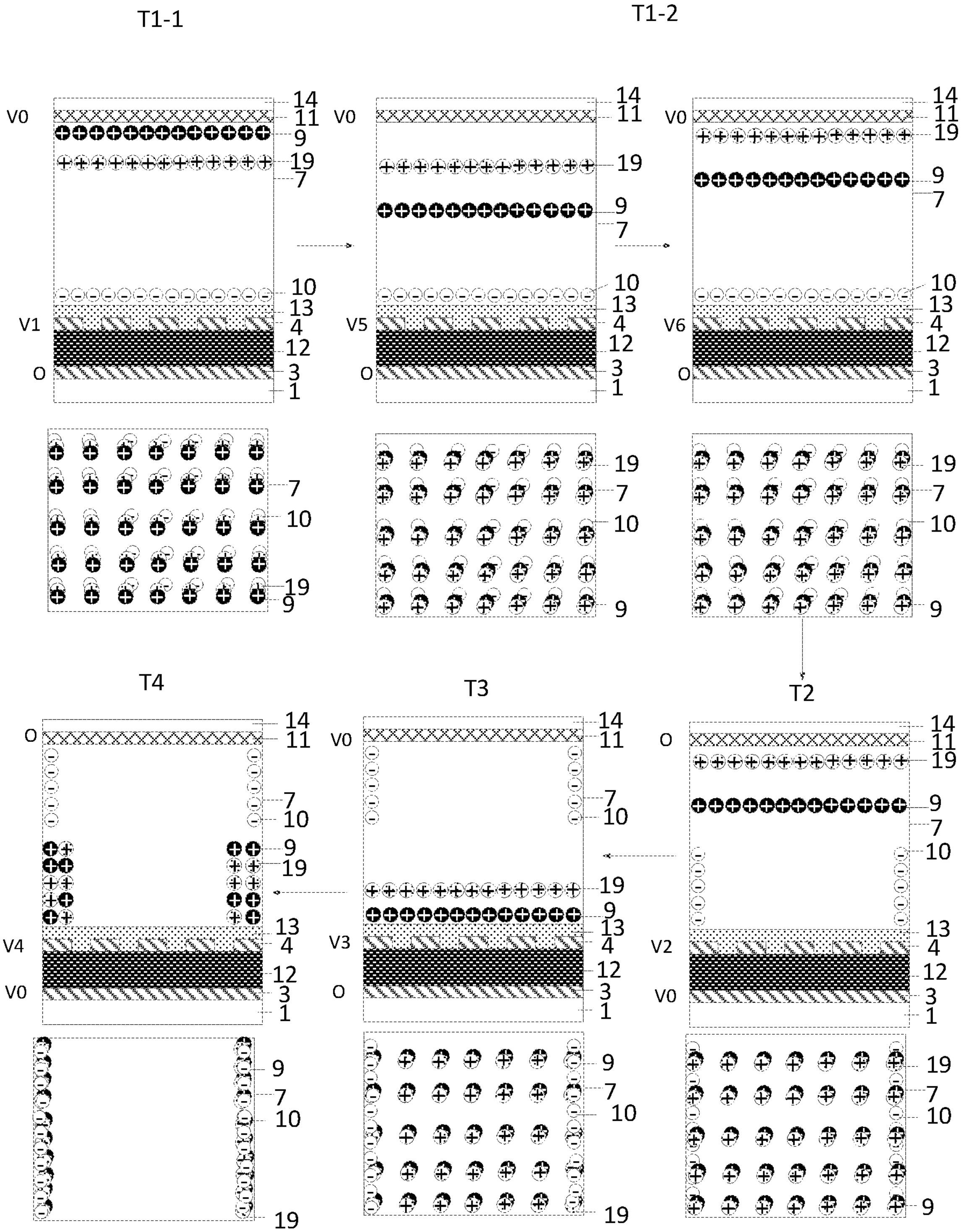
FIG. 15 is a schematic diagram of a method for driving an electronic paper display device provided by another embodiment of the disclosure.

In some embodiments, as shown in FIG. 15, the micro-structure further includes a plurality of third color charged particles 19.

In the first writing stage, while providing the first level signal to the second electrode, and providing the second level signal to the third electrode to drive the first color charged particles to approach the display side of the electronic paper display device, the method further includes:

driving the third color charged particles 19 to move towards o the display side of the electronic paper display device;

in the first writing stage, after providing the first level signal to the second electrode, and providing the second level signal to the third electrode to drive the first color charged particles to approach the display side of the electronic paper display device and drive the second color charged particles to move towards the bottom of the paper film micro-cavity, the method further includes:

keeping to provide the second level signal to the third electrode 11, and providing a seventh level signal V5 to the second electrode 4 to drive the first color charged particles 9 to be located at a side of the third color charged particles 19 facing away from the display side;

keeping to provide the second level signal to the third electrode, and providing an eighth level signal V6 to the second electrode 4 to drive the third color charged particles 19 to approach the display side;

in the third writing stage, while driving the first color charged particles to move towards the bottom of the paper film micro-cavity, the method further includes:

driving the third color charged particles 19 to move towards the bottom of the paper film micro-cavity 7;

in the fourth writing stage, while stopping to provide the second level signal to the third electrode, providing the third level signal to the first electrode, and providing the sixth level signal to the second electrode to drive the first color charged particles to approach the side walls of the paper film micro-cavity, the method further includes:

driving the third color charged particles 19 to approach the side walls of the paper film micro-cavity.

That is, as shown in FIG. 15, the first writing stage T1 is divided into T1-1 sub-stage and T1-2 sub-stage, where in T1-1 sub-stage, the first color charged particles is driven to the display side, and in the T1-2 sub-stage, the third color charged particles is driven to the display side.

In some embodiments, as shown in FIG. 15, both the second level signal and the third level signal are zero-voltage signals V0; that is, a zero-voltage signal is provided to the third electrode during the first writing stage and the third writing stage. The zero-voltage signal is applied to the first electrode in the second writing stage and the fourth writing stage.

In some embodiments, the electrical properties of the first level signal, the sixth level signal and the eighth level signal are the same as the electrical properties of the first color charged particles. The absolute value of the voltage of the first level signal is greater than the absolute value of the voltage of the sixth level signal. The absolute value of the voltage of the sixth level signal is greater than the absolute value of the voltage of the eighth level signal.

The electrical properties of the fourth level signal, the fifth level signal and the seventh level signal are the same as the electrical properties of the second color charged particles. The absolute value of the voltage of the fifth level signal is equal to the absolute value of the voltage of the seventh level signal. The absolute value of the voltage of the fifth level signal is greater than the absolute value of the voltage of the fourth level signal.

The absolute value of the voltage of the first level signal is equal to the absolute value of the voltage of the fifth level signal, and the absolute value of the voltage of the fourth level signal is smaller than the absolute value of the voltage of the eighth level signal.

In some embodiments, taking the refresh frequency as 20 HZ as an example, the T1-1 sub-stage lasts for 8 to 10 frames, and the T1-2 sub-stage includes multiple cycles in each of which the seventh level signal V5 lasts for 1 frame in each cycle, the eighth level signal V6 lasts for 20 frames, and after the multiple cycles, the third color charged particles are driven to the display side. It should be noted that, in the process of driving the third color charged particles to the display side, since the first color charged particles and the third color charged particles have the same electrical properties and the charge-to-mass ratio of the first color charged particles is greater than the charge-to-mass ratio of the third color charged particles, the driving voltage of the third color charged particles is smaller than the driving voltage of the first color charged particles. The eighth-level signal directly provided to the second electrode cannot drive the third color charged particles to the display side. Thus it is necessary to first make the first colored charged particles and the third colored charged particles to be layered by moving toward different directions. When the seventh level signal is provided to the second electrode, the movement speed of the first colored charged particle is greater than that of the third colored charged particle. That is, the first colored charged particle moves a greater distance away from the display side, and then provides the eighth level signal to the second electrode to ensure that the third colored charged particle is driven to the display side.

In some embodiments, the first level signal is 15 V, the fourth level signal is-5 V, the fifth level signal is-15 V, the sixth level signal is 10 V, the seventh level signal is-15 V, and the eight-level signal is 6 V.

It should be noted that, in order to ensure that both the first charged particles and the third charged particles can be driven to the side wall of the paper film micro-cavity in the fourth writing stage, it is necessary to increase the voltage value of the sixth level signal compared with a case that the paper film micro-cavity includes the two kinds of particles which are the first color charged particles and the second color charged particles.

In some embodiments, based on the image to be displayed, for a sub-pixel for displaying the third color, during the writing stage, a zero-voltage signal is provided to the third electrode, and a driving signal is provided to the second electrode. Where the driving signal provided to the second electrode includes multiple pulse units and the zero-voltage signal between the pulse units. The pulse unit includes an eighth level signal and a seventh level signal applied sequentially.

In some embodiments, before the writing stage, the method further includes: a reverse stage and a dithering stage;

the reverse stage is used to balance the charge of charged particles and prevent polarization of charged particles; and the dithering stage is used to separate charged particles of different colors.

In some embodiments, in the reverse stage, the second electrode is usually written with a voltage that is opposite to the driving voltage of the color to be displayed, to balance the charge of charged particles, preventing polarization of charged particles, avoiding built-in electric fields, and thus avoiding a ghosting problem. In the dithering stage, positive and negative high levels are usually applied alternately to the second electrode for multiple frames and periods to fully mix the charged particles. That is, the dithering stage can have an erasing effect. Continuous multi-frame high-level dithering refreshes the electric field, which will arouse an imbalance in the built-in electric field of the particles in the micro-cup. Therefore, the particles close to the side wall of the paper film micro-cavity will gradually break the balance and move to other areas of the paper film micro-cavity, so that they can be in a flat state during the subsequent writing stages.

The display device provided by embodiments of the disclosure is: a mobile phone, a tablet computer, a television, a monitor, a notebook computer, a digital photo frame, a navigator, or any other product or component with a display function. Other essential components of the display device are understood by those of ordinary skill in the art, and will not be described in detail here, nor should they be used to limit the disclosure. For the implementation of the display device, reference can be made to the above embodiments of the display panel, and repeated details will not be described again.

To sum up, in the electronic paper display device and a driving method therefor provided by embodiments of the disclosure, the second electrode includes a plurality of grooves passing through the second electrode along a thickness direction of the second electrode. Voltages are applied to the first electrode and the second electrode, and a curved electric field can be formed between the second electrode and the first electrode. The curved electric field has a parallel component parallel to the plane where the electronic paper display device is located. The parallel component of the electric field is perpendicular to the side wall of the paper film micro-cavity. Therefore, under the action of the parallel component, the charged particles in the paper film micro-cavity approach the side wall of the paper film micro-cavity. The charged particles close to the side wall of the paper film micro-cavity are invisible relative to the light-emitting side of the electronic paper display device, which can make the microstructure transparent. That is, the microstructures can present optical states beyond the color of charged particles, enriching the optical effects of electronic paper display devices and enhancing user experience.

Although the preferred embodiments of the disclosure have been described, those skilled in the art will be able to make additional changes and modifications to these embodiments once the basic inventive concepts are apparent. Therefore, it is intended that the appended claims be construed to include the preferred embodiments and all changes and modifications that fall within the scope of the disclosure.

Evidently those skilled in the art can make various modifications and variations to the disclosure without departing from the spirit and scope of the disclosure. Thus the disclosure is also intended to encompass these modifications and variations therein as long as these modifications and variations to the disclosure come into the scope of the claims of the disclosure and their equivalents.

What is claimed is:

1. An electronic paper display device, comprising: a first base substrate and a plurality of sub-pixels arranged in an array on a side of the first base substrate; wherein each of the plurality of sub-pixels comprises:

a first electrode on the side of the first base substrate;

a second electrode, on a side of the first electrode facing away from the first base substrate, wherein the second electrode comprises a plurality of grooves passing through the second electrode along a thickness direction of the second electrode; orthographic projections of the plurality of grooves fall within an orthographic projection of the first electrode on the first base substrate;

a microstructure, on a side of the second electrode facing away from the first base substrate, wherein the microstructure comprises: a paper film micro-cavity, and a plurality of charged particles in the paper film micro-cavity; the plurality of charged particles comprise: a plurality of first color charged particles and a plurality of second color charged particles; wherein an electrical property of the first color charged particle is opposite to an electrical property of the second color charged particle; and a third electrode, on a side of the microstructure facing away from the second electrode;

wherein a shape of an orthographic projection of each of the plurality of grooves on the first base substrate is a polygonal line.

2. The electronic paper display device according to claim 1, wherein the microstructure further comprises:

transparent electrophoretic liquid in the paper film micro-cavity; and wherein first electrode, the second electrode and the third electrode are light-transmitting electrodes.

3. The electronic paper display device according to claim 1, wherein the plurality of charged particles further comprise: a plurality of third color charged particles in the paper film micro-cavity;

an electrical property of the third color charged particles are same as the electrical property of the first color charged particle; and a charge to mass ratio of the first color charged particle is greater than a charge to mass ratio of the third color charged particle.

4. The electronic paper display device according to claim 1, further comprising:

a reflective layer on a side of the first base substrate facing away from the first electrode; wherein a color of the reflective layer is different from colors of all charged particles.

5. The electronic paper display device according to claim 1, wherein in each of the second electrodes, the plurality of grooves extend along a first direction and are arranged along a second direction, or the plurality of grooves extend along a second direction and are arranged along a first direction;

wherein the first direction intersects the second direction.

6. The electronic paper display device according to claim 1, further comprising: a plurality of first scanning lines and a plurality of data lines crossing horizontally and vertically, a plurality of first signal lines, and a plurality of thin film transistors; wherein:

the plurality of first scanning lines and a plurality of data lines divide areas where the plurality of sub-pixels are located;

the plurality of thin film transistors are arranged one-to-one corresponding to the plurality of sub-pixels;

the first scanning line is electrically connected with a gate electrode of the thin film transistor;

the first signal line is electrically connected with the first electrode;

the data line is electrically connected with a source electrode of the thin film transistor; and the second electrode is electrically connected with a drain electrode of the thin film transistor.

7. The electronic paper display device according to claim 6, wherein the plurality of first scanning lines, the plurality of first signal lines and gate electrodes of the plurality of thin film transistors are formed of a same material and formed in a same process;

the plurality of first scanning lines, the gate electrodes of the plurality of thin film transistors and the first electrode are arranged on a same side of a same film layer;

the plurality of first signal lines are connected with the first electrode on the side of the first electrode facing away from the first base substrate;

the plurality of data lines and source electrodes and drain electrodes of the plurality of thin film transistors are arranged in a same layer; and the plurality of data lines and source electrodes and drain electrodes of the plurality of thin film transistors are arranged between a layer where the plurality of first scanning lines are located and a layer where the second electrode is located.

8. The electronic paper display device according to claim 6, wherein the plurality of first scanning lines and the plurality of first signal lines are alternately arranged.

9. The electronic paper display device according to claim 6, wherein an orthographic projection of the thin film transistor on the first base substrate and the orthographic projection of the first electrode on the first base substrate do not overlap each other.

10. A driving method for an electronic paper display device according to claim 1, comprising:

determining a sub-pixel with a microstructure to be in a transparent state according to an image to be displayed;

in a writing stage, providing driving signals to the first electrode, the second electrode, and the third electrode in the sub-pixel with the microstructure to be in the transparent state to drive a plurality of charged particles of different electrical properties sequentially to approach a bottom of a paper film micro-cavity of the microstructure, and drive charged particles near the bottom of the paper film micro-cavity to side walls of the paper film micro-cavity.

11. The method according to claim 10, wherein, in the writing stage, providing driving signals to the first electrode, the second electrode, and the third electrode in the sub-pixel with the microstructure in the transparent state to drive the plurality of charged particles of different electrical properties sequentially to approach the bottom of the paper film micro-cavity, and drive charged particles near the bottom of the paper film micro-cavity to the side walls of the paper film micro-cavity, comprises:

in a first writing stage, providing a first level signal to the second electrode, and providing a second level signal to the third electrode, to drive the first color charged particles to approach a display side of the electronic paper display device, and drive the second color charged particles to move towards the bottom of the paper film micro-cavity;

in a second writing stage, stopping to provide the second level signal to the third electrode, providing a third level signal to the first electrode, and providing a fourth level signal to the second electrode, to drive the second color charged particles to approach the side walls of the paper film micro-cavity;

in a third writing stage, providing a fifth level signal to the second electrode, and providing the second level signal to the third electrode, to drive the second color charged particles to move towards the display side of the electronic paper display device, and drive the first color charged particles to move towards the bottom of the paper film micro-cavity;

in a fourth writing stage, stopping to provide the second level signal to the third electrode, providing the third level signal to the first electrode, and providing a sixth level signal to the second electrode, to drive the first color charged particles to approach the side walls of the paper film micro-cavity.

12. The method according to claim 11, wherein the microstructure further comprises a plurality of third color charged particles;

in the first writing stage, while providing the first level signal to the second electrode, and providing the second level signal to the third electrode to drive the first color charged particles closer to the display side of the electronic paper display device, the method further comprises:

driving the third color charged particles to move towards the display side of the electronic paper display device;

in the first writing stage, after providing the first level signal to the second electrode, and providing the second level signal to the third electrode to drive the first color charged particles to approach the display side of the electronic paper display device and drive the second color charged particles to move towards the bottom of the paper film micro-cavity, the method further comprises:

keeping to provide the second level signal to the third electrode, and providing a seventh level signal to the second electrode to drive the first color charged particles to be located on a side of the third color charged particles facing away from the display side;

keeping to provide the second level signal to the third electrode, and providing an eighth level signal to the second electrode to drive the third color charged particles to approach the display side;

in the third writing stage, while driving the first color charged particles to move towards the bottom of the paper film micro-cavity, the method further comprises:

driving the third color charged particles to move towards the bottom of the paper film micro-cavity;

in the fourth writing stage, while stopping to provide the second level signal to the third electrode, providing the third level signal to the first electrode, and providing the sixth level signal to the second electrode to drive the first color charged particles to approach the side walls of the paper film micro-cavity, the method further comprises:

driving the third color charged particles to approach the side walls of the paper film micro-cavity.

* * * * *